United States Patent [19]
Richard et al.

[11] Patent Number: 5,922,074
[45] Date of Patent: Jul. 13, 1999

[54] METHOD OF AND APPARATUS FOR PROVIDING SECURE DISTRIBUTED DIRECTORY SERVICES AND PUBLIC KEY INFRASTRUCTURE

[75] Inventors: Patrick Richard; Andrew Csinger; Bruce Knipe; Bruce Woodward, all of Vancouver, Canada

[73] Assignee: Xcert Software, Inc., Vancouver, Canada

[21] Appl. No.: 08/808,846

[22] Filed: Feb. 28, 1997

[51] Int. Cl.⁶ .................................................. G06F 11/00
[52] U.S. Cl. ............................................................ 713/200
[58] Field of Search ............................... 395/186, 187.01, 395/188.01, 200.59; 380/4, 25, 30

[56] References Cited

U.S. PATENT DOCUMENTS

| | | | |
|---|---|---|---|
| 4,405,829 | 9/1983 | Riverst et al. | 178/22.1 |
| 4,864,494 | 9/1989 | Kobus, Jr. | 364/200 |
| 5,138,712 | 8/1992 | Corbin | 395/700 |
| 5,214,702 | 5/1993 | Fischer | 380/30 |
| 5,572,673 | 11/1996 | Shurts | 395/186 |
| 5,586,260 | 12/1996 | Hu | 395/186 |
| 5,604,490 | 2/1997 | Blakley, III et al. | 340/825.31 |

OTHER PUBLICATIONS

Erie Bina et al. Secure Access to Data Over the Internet (IEEE, pp. 99–101), Feb. 1994.

*Primary Examiner*—Robert W. Beausoliel, Jr.
*Assistant Examiner*—Pierre Eddy Elisca
*Attorney, Agent, or Firm*—Nixon & Vanderhye P.C.

[57] ABSTRACT

In an exemplary embodiment, the server receives the client's Distinguishing Name (DN), and then searches its directory for identification information and access control rights for this specific context. The server can act as a stand-alone server or in conjunction with other directory services on the network. A client must have a verifiable identity in order for secure communications to continue. A client's identity can be said to be fully verifiable if the server has access to the directory service that maintains that client's DN. The client receives the server's DN, and the client can then determine whether or not to accept a response to a request for information (i.e., trust the response). The client determines the identity of the server using some directory service (the client can act stand-alone or as a client of other directory servers). A server is fully verifiable if the client can identify the directory service that maintains the server's DN. In both cases, determining identity is predicated on being able to identify a directory service. Since servers and clients are issued identities (DN's) from some directory service before they participate in secure communications, they are able to at least identify their "home" directory service. Their "home" directory service communicates with other directory services, each "serving" their lists of electronic identities to each other using secure directory services. In this manner, a client or server can verify the peer identity of a secure communicator by relying on the trusted "home" directory service. Public Key certificates, certificate revocation lists, pending certificate requests, Certification Authority policy, and other information is stored in the directory server. Access to the directory server is through secure communications; this maintains the integrity and privacy of the information.

25 Claims, 8 Drawing Sheets

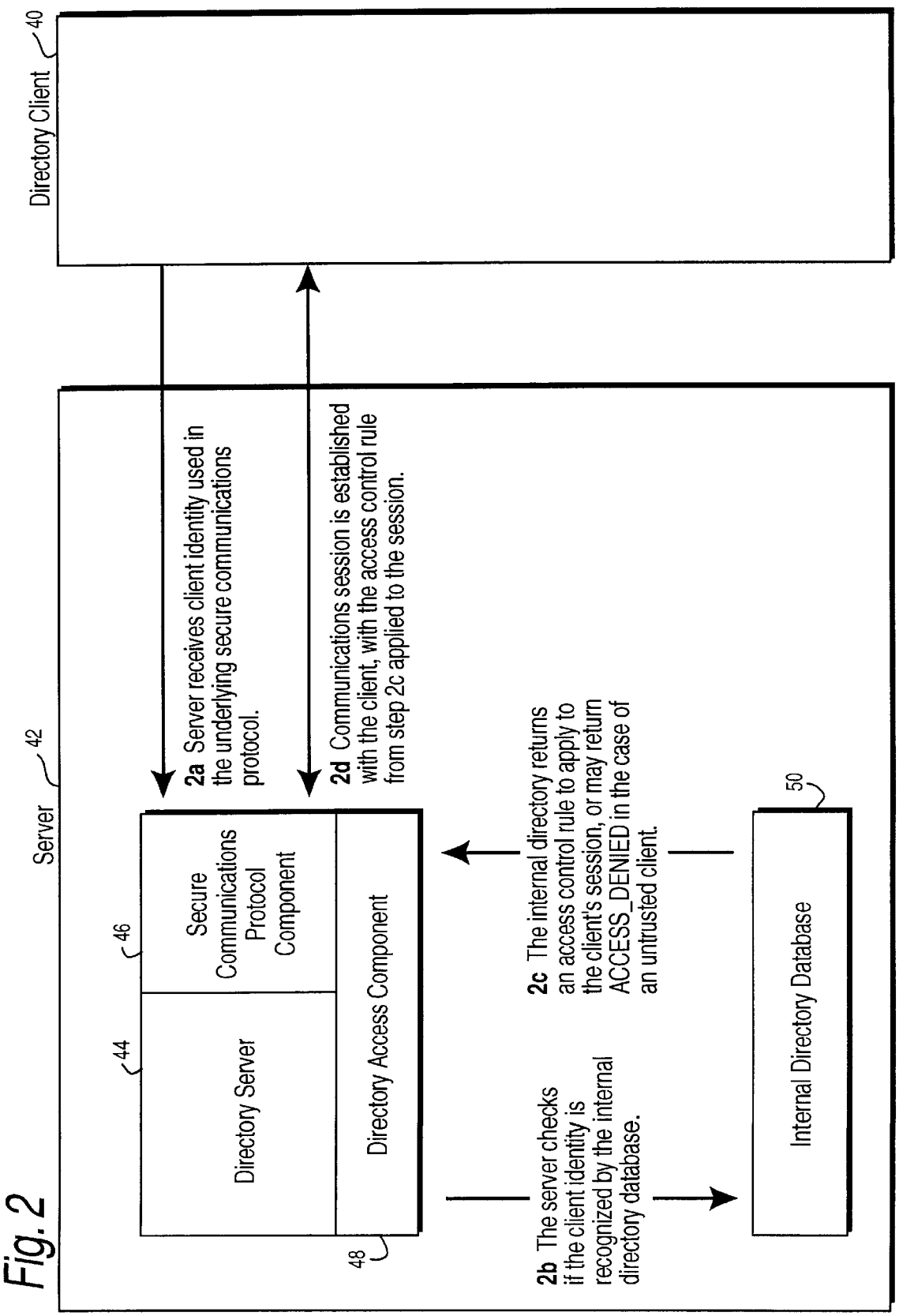

Fig. 3

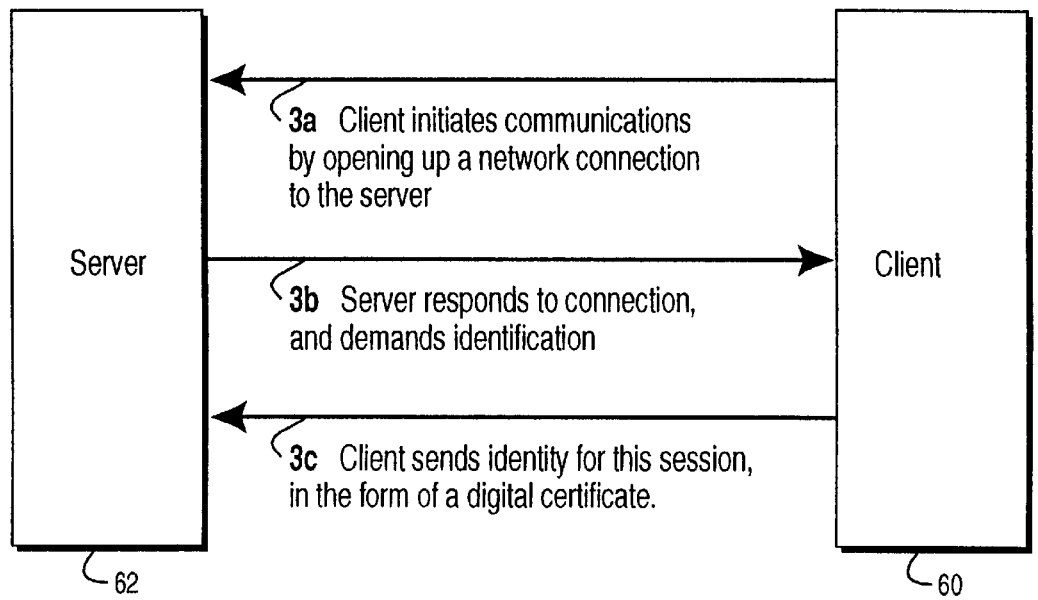

Fig. 4

```
Certificate          ::= SIGNED SEQUENCE{
       version                [0]Version DEFAULT 1988,
       serialNumber           SerialNumber,
       signature              Algorithmidentifier
       issuer                 Name
       validity               Validity,
       subject                Name,
       subjectPublicKeyInfo   SubjectPublicKeyInfo}
Version           ::= INTEGER { 1988(0)}
SerialNumber      ::= INTEGER
Validity          ::= SEQUENCE {
       notBefore      UTCTime,
       notAfter       UTCTime}
SubjectPublicKeyInfo   ::= SEQUENCE{
       algorithm      Algorithmidentifier
       subjectKey     BIT STRING}
Algorithmidentifier ::= SEQUENCE{
       algorithm      OBJECT IDENTIFIER
       parameters     ANY DEFINED BY algorithm
                      OPTIONAL}
```

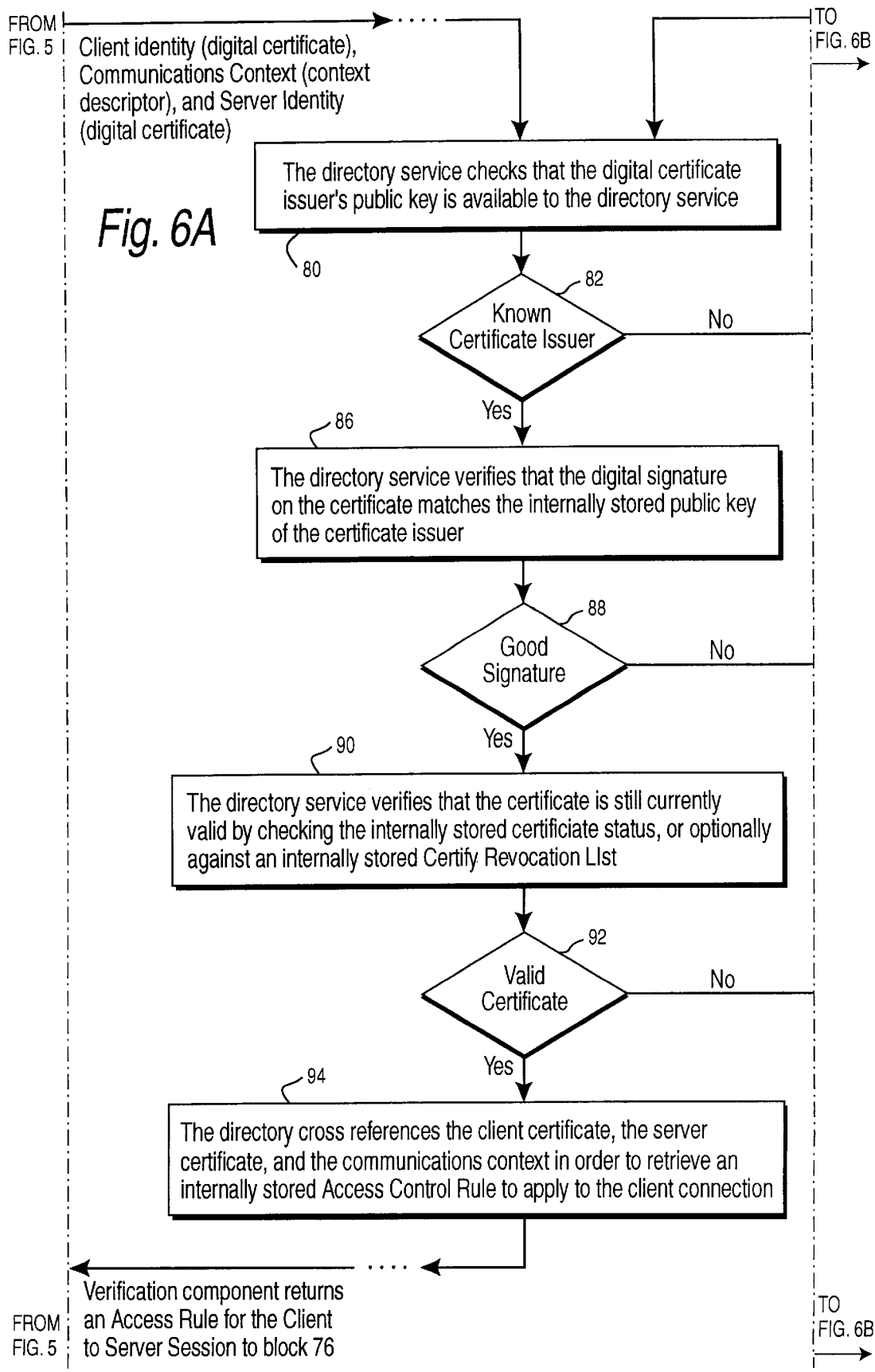

*Fig. 7*

```
Verification_Descriptor        ::= SEQUENCE{
       Clientidentity          Certificate,
       ContextDescriptor       Context,
       Server identity         Certificate }
```

*Fig. 8*

```
Context    ::= SEQUENCE{
       version        [0]Version DEFAULT 1996,
       time           UTCTime,
       protocol       OBJECT IDENTIFIER
       parameters     ANY DEFINED BY protocol
                      OPTIONAL}
Version    ::= INTEGER { 1996(0) }
```

*Fig. 9*

```
IssuerName = Verification_Descriptor->Clientidentity->Issuer
IssuerPublicKey =    ::= SEQUENCE{
       algorithm          Algorithmidentifier
       Key                BIT STRING}
Algorithmidentifier  ::= SEQUENCE{
       algorithm          OBJECT IDENTIFIER
       parameters         ANY DEFINED BY algorithm
                          OPTIONAL}
```

*Fig. 10*

```
Clientidentity ::= SIGNED SEQUENCE{
       ...
       }
IssuerPublicKey =    ::= SEQUENCE{
       algorithm          Algorithmidentifier
       Key                BIT STRING}
Algorithmidentifier  ::= SEQUENCE{
       algorithm          OBJECT IDENTIFIER
       parameters         ANY DEFINED BY algorithm
                          OPTIONAL}
```

Fig. 11
```
Clientidentity           ::= Certificate
CertificateRevocationList   ::= ATTRIBUTE
        WITH ATTRIBUTE-SYNTAX CertificateList
AuthorityRevocationList     ::= ATTRIBUTE
        WITH ATTRIBUTE-SYNTAX CertificateList
CertificateList             ::= SIGNED SEQUENCE{
        signature AlgorithmIdentifier,
        issuer Name,
        lastUpdate UTCTime,
        revokedCertificates
                SIGNED SEQUENCE OF SEQUENCE{
                signature AlgorithmIdentifier,
                issuer Name, CertificateSerialNumber subject,
                revocationDate UTCTime}
                OPTIONAL}
```

Fig. 12
```
ACL = Retrieve_ACL from Internal Database (Clientidentity,
ContextDescriptor, Serveridentity)
```

Fig. 13
```
ACL_Rule            ::= SEQUENCE{
        towhat              OBJECT IDENTIFIER,
        towhat_parameters   ANY DEFINED BY towhat
                            OPTIONAL
        bywhat              OBJECT IDENTIFIER,
        bywhat_parameters   ANY DEFINED BY bywhat
                            OPTIONAL
        access              INTEGER}
Version             ::= INTEGER { 1996(0) }
```

METHOD OF AND APPARATUS FOR PROVIDING SECURE DISTRIBUTED DIRECTORY SERVICES AND PUBLIC KEY INFRASTRUCTURE

FIELD OF THE INVENTION

The invention generally relates to the field of digital data processing communications systems in which a user at a workstation requests information or services from a server computer. More particularly, the invention relates to a method of and apparatus for providing a public key infrastructure via secure directory services within a computer system and/or a computer network.

BACKGROUND AND SUMMARY OF THE INVENTION

With the widespread and ever mushrooming use of network-based communications, a business world where electronic-based business transactions are the rule rather than the exception has been a longstanding vision shared by many. A major stumbling block to widespread electronic business transactions is the need to effectively deploy a secure communications system providing privacy, message integrity, non-repudiation and authenticity.

Cryptographic systems have been widely used to ensure the privacy and authenticity of messages communicated over a wide variety of different networks. Many conventional cryptosystems are not satisfactory for widespread business world deployment due to well recognized problems relating to, for example, key distribution.

Public key cryptographic systems have been advantageously utilized to solve existing cryptographic system problems including key distribution problems. Such public key cryptographic systems use a public key/private key pair and decouple the encrypting and decrypting processes such that the encrypting process key is separate and distinct from the decrypting process key. In such systems, given the knowledge of the encryption key and an encryption key that is large enough, it is not viable to compute the decryption key and thus the encryption key for users may be distributed or published. Anyone desiring to communicate with a user at a particular destination, encrypts a message under the destination user's public key. Only the destination user who retains the secret decrypting key of the public key/private key pair is able to decipher the transmitted messages.

In public key cryptographic systems, it is known that a trusted authority may create a digital message which contains a claimant's public key and the name of the claimant. A representative of the trusted authority digitally signs the digital message with the authority's own digital signature. Such a digital message, referred to as a digital certificate is transmitted along with the use of the claimant's own digital signature. See U.S. Pat. No. 4,405,829 issued to Rivest et al., which discloses exemplary methodology for a practical public key cryptographic system implementation. Also see U.S. Pat. No. 5,214,702, which describes a public key digital signature cryptographic system having enhanced digital signature certification.

Existing public key cryptography methodologies envision that electronic business transactions employ a global standard for tying the public key use to a high level global authority, using what is referred to as the X.500 standard. Not all users, however, participate in this global standard, thereby limiting the standard's practical utility.

The present methodology does not rely on a global standard. In accordance with an exemplary embodiment of the present invention, cryptographic keys may be resident in a user's own directory services, while permitting users to securely communicate with each other as a result of using the distributed directory services described herein. The present invention utilizes secure distributed directory services to maintain a public key infrastructure, and does not operate in the conventional global, top-down hierarchy using a "meta-certifier", who must certify all users in order to provide the desired level of security.

In accordance with an exemplary embodiment, users may receive digital certificates from various other users and still securely communicate with each other with sufficient security such that electronic business transactions may be culminated. The present invention incorporates the use of policy statements which efficiently permit trust levels to be applied to a user's service request based upon an analysis by the recipient of the message sender's identity via the distributed directory services system. Thus, the fact that a particular message sender is identified in a given distributed directory service using designated policy statements, permits the message recipient to determine the degree of trust to be given to a message sender.

The exemplary embodiment implements the concept that by being able to uniquely identify a client in a specific communications context, a server can assign the client with specific access rights for that context. The access rights granted to a client depend on the client's identity in that context.

Given that access rights are based on identity, the feature of being able to uniquely identify a client becomes significant. The server requires a secure and infallible method of identifying the client. The infallible method is based on using secure directory services of the nature described in the present exemplary embodiment. By securely receiving identity verification services from a directory service, the server can then determine the access rights to grant to a client. This allows a server to deliver client-sensitive information, without prior knowledge of the client.

In accordance with an exemplary embodiment of the present invention, a client initiates a secure connection with a server providing directory services. The server, taking advantage of the authentication feature in the secure communications methodology described herein, uniquely identifies the client and thus obtains the client's distinguished name (DN). The server uses the client's DN to determine what access rights to grant the client, either by looking up the client's DN in its own directory or by recursively acting as a client to another directory server that contains definitive information about that particular DN. The directory server then returns the information to the client that is specific to that client and is able to do so by taking advantage of the authentication feature provided by the secure communications methodology used herein.

In accordance with another aspect of the present invention, a client initiates a secure communication with a server. The methodology described herein is also applicable to the instance where the client and server are on the same machines so that the network described herein may be internal to the computer in this special case. The server is able to uniquely identify the client based on the authentication feature of the secure communications server as a directory service to verify the identity of the client's DN and for access control permissions to grant to the client. This communication with the directory service must be over a secure communications channel because the information passed on to the client/server communication depends on the result and verification and access rights returned by the directory service. The directory service responds to the server with verification information and access control information, particular to that client and the server is able to determine what information should be sent to the client. The server then returns either none, some or all the information requested by the client.

In an illustrative embodiment, the identities of the parties involved determine the access rights for a directory service's communications context. All requests for information made by the client, receive customized directory service responses. The peer identities are determined through the use of secure communications.

In an exemplary embodiment, the server receives the client's Distinguishing Name (DN), and then searches its directory for identification information and access control rights for this specific context. The server can act as a stand-alone server or in conjunction with other directory services on the network. A client must have a verifiable identity in order for secure communications to continue. A client's identity can be said to be fully verifiable if the server has access to the directory service that maintains that client's DN.

The client receives the server's DN, and the client can then determine whether or not to accept a response to a request for information (i.e., trust the response). The client determines the identity of the server using some directory service (the client can act stand-alone or as a client of other directory servers). A server is fully verifiable if the client can identify the directory service that maintains the server's DN.

In both cases, determining identity is predicated on being able to identify a directory service. Since servers and clients are issued identities (DN's) from some directory service before they participate in secure communications, they are able to at least identify their "home" directory service. Their "home" directory service communicates with other directory services, each "serving" their lists of electronic identities to each other using secure directory services. In this manner, a client or server can verify the peer identity of a secure communicator by relying on the trusted "home" directory service.

The present exemplary implementation of the invention can be used to implement a Public Key Infrastructure in the following manner. Public Key certificates, certificate revocation lists, pending certificate requests, Certification Authority policy, and other information is stored in the directory server. Access to the directory server is through secure communications; this maintains the integrity and privacy of the information. Administrators acting in the capacity of the Certification Authority are granted full access to the repository, by issuing them the "Administrator's DN", and can add new certificates, modify certificate revocation lists, etc. Others would have less access, to the limit that unknown parties may only be allowed to submit certificate requests or download public certificates (and revocation lists). Additionally, certificates can be used as vectors in directory searches; the client attempting the directory search has its access limited by its client DN, and the client's DN may not contain a name at all, but rather a hash of the client's policy. In this manner, certificates can be issued that contain minimal information; in fact, they only need to contain a unique identifier that can be used as a vector in the vector space (this would be the entire namespace that is visible to that particular client).

BRIEF DESCRIPTION OF THE DRAWINGS

These as well as other features of this invention will be better appreciated by reading the following description of the preferred embodiment of the present invention, taken into conjunction with the accompanying drawings of which:

FIG. 2 is a data flow diagram showing illustrative data communicated between a directory client and a server;

FIG. 3 is a data flow diagram exemplifying how a client may be identified in a secure communications protocol;

FIG. 4 is an example of a digital certificate which may be used in conjunction with FIG. 3;

FIGS. 6A and 6B are a flowchart delineating an exemplary sequence of operations involved in the identification verification process;

FIG. 7 is an exemplary verification descriptor object/data structure;

FIG. 8 is an exemplary context descriptor object/data structure;

FIG. 9 is an exemplary data structure/object utilized in conjunction with FIG. 6A, block 80, verification analysis;

FIG. 10 is an exemplary object/data structure used in performing verification analysis of FIG. 6A, block 86;

FIG. 11 is an exemplary object used in performing the verification analysis of FIG. 6A, block 90;

FIG. 12 is an exemplary object/data structure used for retrieving an access control list rule;

FIG. 13 is an access list control rule object/data structure.

DETAILED DESCRIPTION OF AN EXEMPLARY EMBODIMENT OF THE INVENTION

Figure 1:
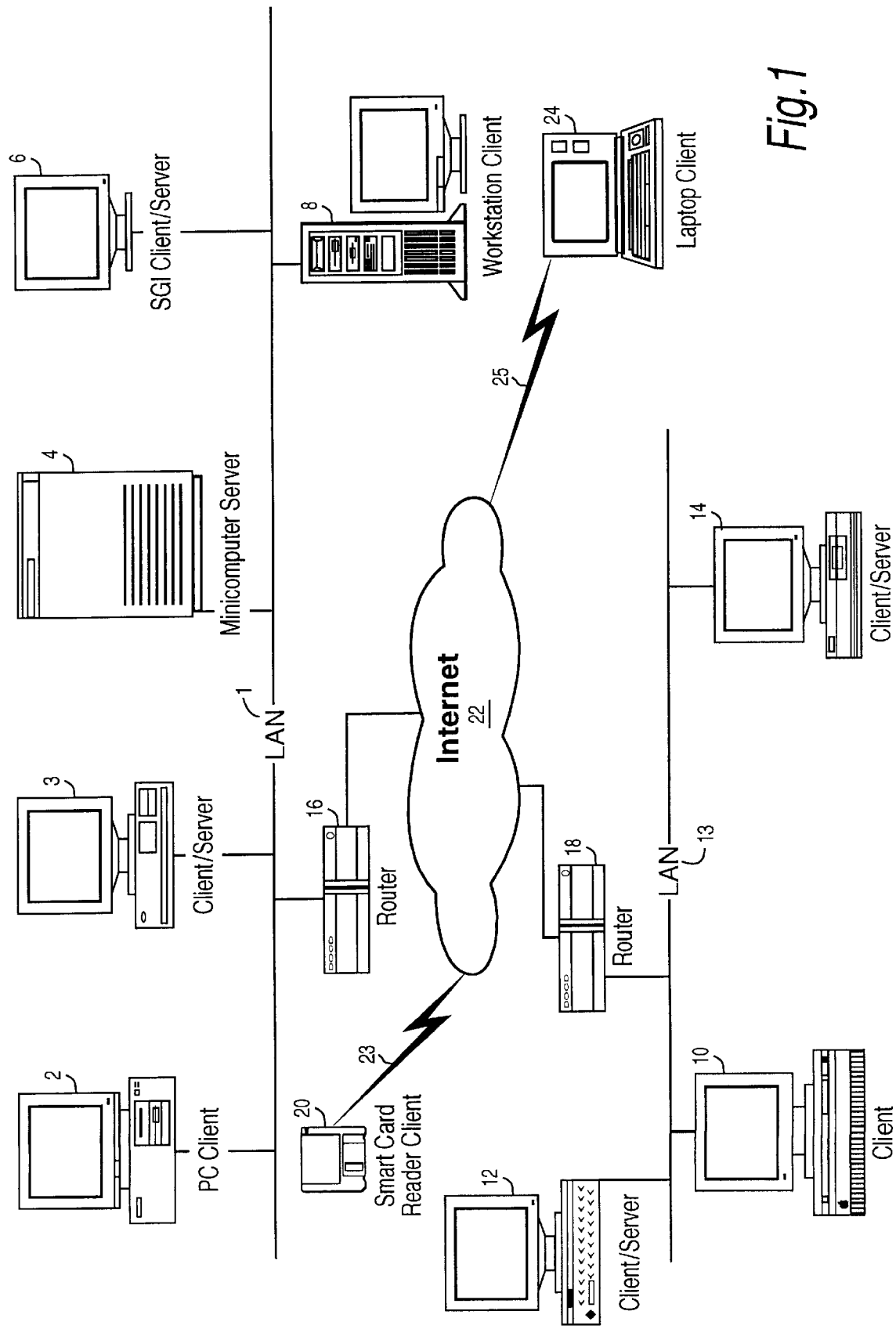
FIG. 1 is a block diagram of an exemplary communications system within which the present invention may be utilized.

FIG. 1 shows in block diagram form, an exemplary computing system within which the present invention may be utilized as part of an electronic commerce/communications network. It should be recognized that, while the present methodology may be utilized in such a communications network environment, the invention may likewise be used in conjunction with a wide range of data processing systems, including one or more laptop computers, stand-alone, PC-type computers, minicomputers, and any other computer system environment where data security is a significant concern and practically implementable.

Before describing an exemplary communications system, which may be used in conjunction with the present invention, terminology utilized herein is first described. A "client process" or program runs on a computer attached to a network. The client process is distinguished by the fact that it makes requests for information or services. The client process may be referred to herein as a client.

A "server process" also runs on a computer attached to a network. The server process is distinguished by the fact that it fulfills requests for information or services. The server process may be referred to herein as a server. It should be recognized that a client and a server may actually run on the same computer and that a server may be a client to another server.

As used herein, "secure communications" typically refers to any data transport mechanism, which preferably provides, but is not limited to, privacy, message integrity, non-repudiation, and authenticity.

A "Distinguished Name" (DN) uniquely identifies an entity participating in a digital conversation preferably enabled via secure communications.

A "communications context" is an instance where a client is requesting information from some server, and the request for information can be distinguished by one or more of the following: client DN, server DN, information requested, information available, and access controls on that information.

Turning back to FIG. 1, this figure shows an exemplary communications network including multiple client computing devices, and combination client/server computing services interconnected via local networks, and through an Internet. The local area networks (LANs) shown in FIG. 1, i.e., LAN 1 and LAN 13 are depicted for illustration purposes only. These networks are intended to be representative of any of the many network designs, such as Ethernet, token ring, or other type of networks having attached clients and servers which are likewise intended to be subsumed by the FIG. 1 architecture. By way of example only, LAN 1 may be an Ethernet 802.3 10 base T network. A variety of protocols run on LAN 1, including TCP/IP and NETBIOS. Although numerous protocols may be running on LAN 1, TCP/IP is preferably utilized, which is the protocol that runs on the Internet.

As shown in FIG. 1, LAN 1 includes a PC-type computer 2 operating solely as a client, which may, for example, be a Windows 95-based workstation. LAN 1 additionally includes a workstation 3 which may, for example, be an IBM RS 6000, operating as both a client and a server. The IBM RS 6000 typically runs the AIX operating system. Client/server 3 may be running as a client in the context of the methodology described herein and/or as a server having its own X.500 directory space.

LAN 1 also includes a minicomputer server 4, which may be any commercially available minicomputer. Minicomputer server 4 may, for example, be dedicated to providing digital certificates or directory services. Minicomputer server 4 may be attached to another network (not shown). As suggested by inclusion of minicomputer server 4, servers are not limited to workstation type devices.

LAN 1 may, for example, also include a graphics-based SGI client/server 6, which may be one of the workstations manufactured by Silicon Graphics Corporation. Client/server 6 may perform computer graphics and/or CAD operations. Workstation client 8 may, for example, be an IBM PC-based work station and is representative of the numerous additional available workstations which may, if desired, be coupled to LAN 1.

The secure communications with directory services of the present invention occur not only on the exemplary LAN 1, but also on LAN 13. LAN 13 also runs protocols including TCP/IP for Internet communication.

LANs 1 and 13 may, for example, communicate via the Internet 22, via routers 16 and 18. Routers 16 and 18 are conventional routing computers for Internet communications, having sufficient memory capacity to perform necessary routing functions and keep track of the devices with which they are associated on the Internet. A router provides a quick connection between two devices on the Internet. A router 16,18 may serve more than one LAN. The routers 16 and 18 may, for example, be routers commercially available from Cisco Corporation.

Various other clients such as Smart Card Reader 20 and laptop client 24 may be attached to, and communicate with, any of the other depicted devices through the Internet via phone lines 23,25. Smart Card Reader 20 may, for example, be a Visa card reader. With respect to Smart Card Reader 20, although the concept of a "client" described thus far has been applied to a program requesting information or services, a client may also be hardware or circuitry embodied in, for example, a Smart Card Reader requesting information or services.

LAN 13 includes a client/server 12, which may, for example, be a SUN Microsystems SPARC, which is a RISC-based workstation. LAN 13 also includes a client workstation 10 which may be a Mac II, manufactured by Apple Corporation, and a client/server 14, which may be a DEC workstation. Workstations 10, 12 and 14 are exemplary workstations which may be coupled to a LAN each of which may be running different operating systems.

Although the LANs 1 and 13 are coupled together via the Internet 22, the method and apparatus may be advantageously utilized without Internet connections. Thus, for example, an intraoffice network may distribute digital certificates and secure information in accordance with the present invention. It should be understood that the present invention may be employed with any subset of the structure shown in FIG. 1.

FIG. 2 is a data flow diagram showing illustrative data communicated between directory client 40 and server 42, in accordance with an exemplary embodiment of the present invention. The directory client 40 may be, for example, any of the enumerated clients previously described above in conjunction with FIG. 1. Similarly, server 42 may be, for example, any of the servers identified above in FIG. 1. The directory server 44, the secure communications protocol component 46, the directory access component 48, and the internal directory database 50 are resident in server computing device 42. As set forth above, directory client 40 requests information or services from a server 42. Client 40 is identified as a directory client and is therefore seeking directory information. The directory itself may be distributed and reside virtually anywhere in the FIG. 1 network. The directory stores information regarding individual users and corporate entities such as, for example, may be contained in a white page directory. For example, the directory may include client data including a Distinguished Name or another unique client identifier. In addition to the client identifier, a directory may store public key information for identifying the public key of the party to which it is desired to securely communicate. Directory Server 44 within server 42 operates in accordance with a preestablished directory protocol to serve directory information to directory clients. If the directory server 42, by accessing its associated internal data base 50, can adequately respond to the client's directory related query, server 42 appropriately responds. If not, the question may be responded to by server 44 by returning a referral to directory client 40 to identify the location of a server which can respond. Alternatively, directory server 44 may be chained to other directory servers and may attempt to find the answer to the inquiry, rather than sending a referral to directory client 40. In this context, the directory server 44 operates as a client to another directory server.

The secure communications protocol component 46 ensures that the directory client 40 communicates with directory server 44 using a secure communications protocol. The secure communications protocol preferably provides privacy, authentication, non-repudiation, and integrity to the communications between client 40 and server 42. In conventional systems, no response is provided when a client is not entitled to access a server. In accordance with the present invention, a response may be obtained from a directory server which indicates whether the client 40 has enough privilege to get the requested information as will be described further below.

The directory access component 48 of server 42 permits communication with the server's internal database 50. The server 42 determines via the direct access component 48, what type of access the client 40 is entitled to have.

In operation, in accordance with step 2a, server 42 receives the client identity from the directory client 40 using the underlying secure communications protocol. Because the communications protocol provides authenticity assurance, the client is securely identified so that the server receives a known identity which can later be verified.

FIGS. 3 and 4 show an example of how a client may be identified using a secure communications protocol. As exemplified in FIG. 3, client 60 initiates communication with server 62 by opening up a network connection to the server. The precise matter of initiation will depend on the nature of the network. Server 62 responds to the connection and demands that client 60 identify itself. Client 60 then sends its identity for this communication session in the form of a digital certificate to server 62. By way of example only, the secure communications protocol utilized may be the commercially available SSL protocol, which in accordance with the present invention is advantageously applied to directory services to provide a secure directory services system.

FIG. 4 is an example of a digital certificate 64 which may be used to identify the client as described in conjunction with FIG. 3 above. The digital certificate may be, but is not required to be, structured as recommended in the X.509 standard. The certificate may be custom designed to include numerous different and/or additional fields as desired. The certificate may be written, for example, in ASN.1 syntax. The digital certificate 64 includes a "certificate" field which is a digitally signed sequence, that includes a hash of the data identified below, which is then encrypted with the signing party's private key. Within the information that is digitally signed is a version number, a serial number which uniquely identifies the certificate, and the signature of the signing party in accordance with an identified algorithm such as RSA. Additionally included within the signed certificate information is an identification of the certificate issuer, identifying the name of the party that signed the digital certificate. The certificate includes a validity field which specifies how long the certificate is valid. The subject field specifies the name of the party who holds the certificate, and the public key information field specifies the public key of the subject. The fields referred to above are expanded in FIG. 4 to show their constituent construction in more detail. FIG. 4 thus shows an exemplary data structure of a digital certificate which may be used in conjunction with the present invention.

Turning to back to FIG. 2, in accordance with step 2b, the server 42 checks if the client identity is recognized by the internal directory data base. Thus, if directory client 40 transmits client identity information in the form of a digital certificate, such as that shown in FIG. 4, server 42 checks the digital certificate to confirm recognition from its internal data base 50. The server 42 initially checks the digital certificate to confirm that the signature of the issuer matches the signer's signature. Thus, if the internal directory data base 50 has no information regarding the certificate's signer, the client will not be identifiable. Under such circumstances, the server 42 may act as a client to retrieve the required signer's public key information from another server to complete the identification. Details of this process are described in further detail in conjunction with FIG. 6 and subsequent figures described below.

Once the identity of the client is verified, the internal directory returns an access control rule to apply to the client's communication session. Alternatively, it may return an access denied in the case of an untrusted client. Once the client's identity is confirmed, an access control list is accessed to retrieve the access rules that apply to the communications session. This information is returned to the directory service protocol 46 via the directory access computer 48.

With respect to step 2d, the communications session is established with the client and the retrieved access control rules are applied to the communications session. In this fashion, a client may be precluded from retrieving directory information that it is not entitled to retrieve, as specified by access control rules. While FIG. 2 shows the communication between a directory client 40 and a directory server 42, the methodology is intended to be applied to a client and server. For example, the server may act to retrieve access control rules for clients going to its web site.

Figure 5:
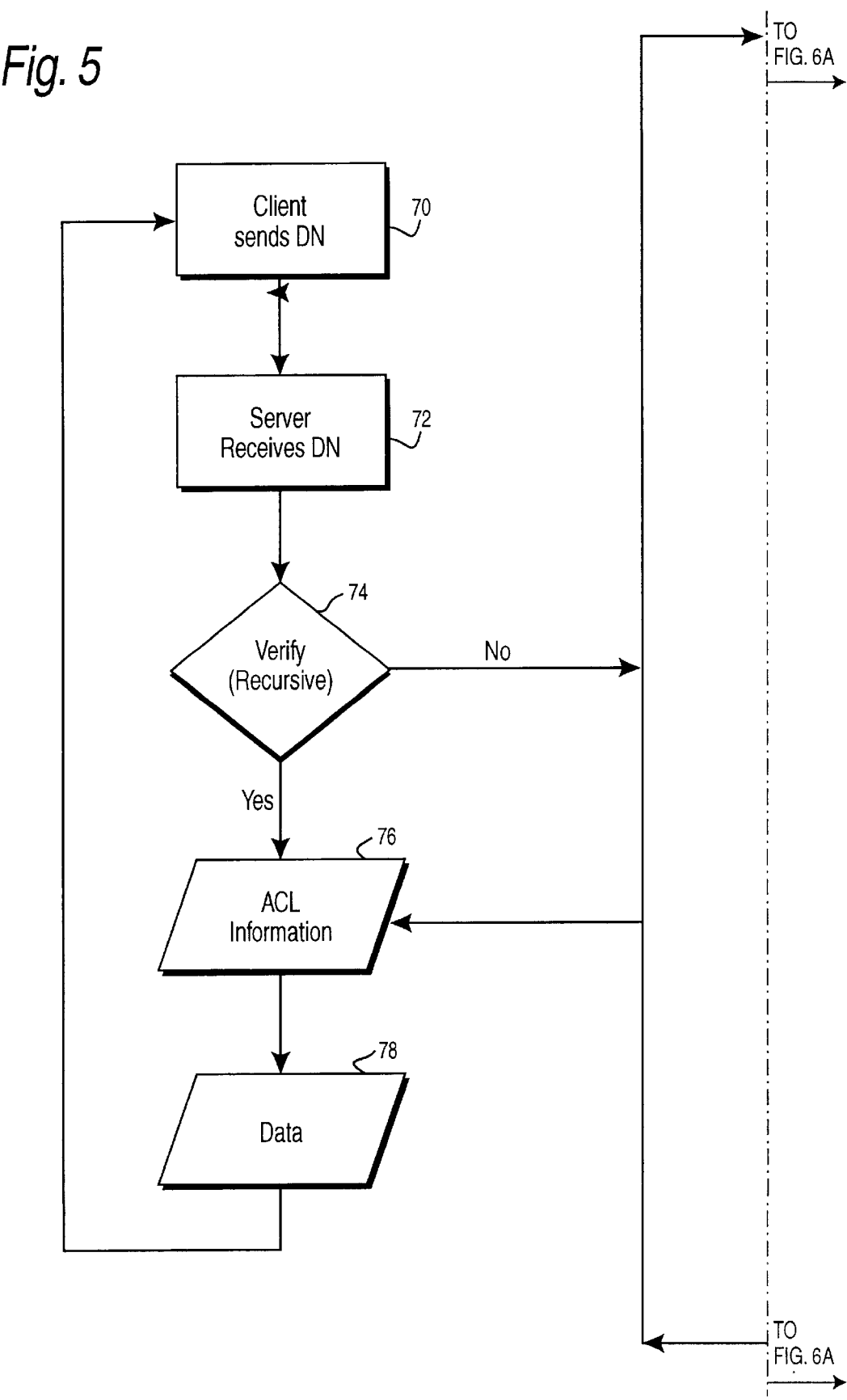
FIG. 5 is a flowchart of the general sequence of operations performed in accordance with an exemplary embodiment.

FIG. 5 shows in flowchart form a general sequence of operations performed in accordance with an exemplary embodiment of the present invention. As indicated in FIG. 5, initially the client sends its Distinguished Name (DN) which uniquely identifies the client (70). Thereafter, the server receives the distinguished name DN (72).

As suggested by block 74, the server analyzes the client DN to determine the appropriate ACL access control rules to apply. As indicated by the "recursive" parenthetical in block 74, the server may access other directory servers throughout the Internet in order to determine the appropriate access rules to apply. In addition to access control rules, degree of trust related information which may be associated with the client also may be accessed from different servers on the Internet. The server, by making requests to other directory servers on the Internet, itself becomes the client in its effort to provide the access control and trust rules to apply to the client. Thus, in the context of a web site, if a client sends its distinguished name DN (or an alternative identifier) to a web site, the web site needs to identify the client either at an internal data base at its associated server or at other web sites. The web site can then seek identifying information from other directory server web sites until a trust relationship with the requesting client is determined. With such information retrieved from other directory servers, the degree of trust which may be associated with the requesting client may be determined.

If the client is verified in block 74 processing, ACL information is returned to the directory server as indicated in block 76 and is applied to the data connection. The access control rules and trust related information are applied to the data connection to ensure that actions take place during the data connection in accordance with the access control rules and/or the trust information, to thereby ensure that authorization levels are not exceeded.

In accordance with this methodology, for example, a digital certificate possessed by a party which has been issued by Visa may be transmitted to a web site and an electronic transaction may take place, whereby goods are purchased. The transaction may be completed in accordance with the client's credit rating which may be checked, for example, through Visa's directory server. The Visa directory server may determine the nature of the credit rating to transmit depending upon the particular context, e.g., the party at the web site requesting the information and the individual client. During this process, the web site would likewise be transmitting to the Visa directory server its digital certificate so that the Visa directory server can determine whether the web site is, for example, a business which has recently gone bankrupt, or another bank which should be associated with a great deal of trust. In this fashion, the present invention enables the transaction parameters to be fully developed in the particular communications or business transaction context.

In accordance with FIG. 5 at block 78, having obtained the appropriate access control list rules and/or trust information, such information is applied to the data connection. The data requested is transmitted back to the client, as shown in FIG. 5, although the access control rule or trust level information would not be communicated. The process may be repeated in connection with different subsequent communication sessions.

Figure 6B:
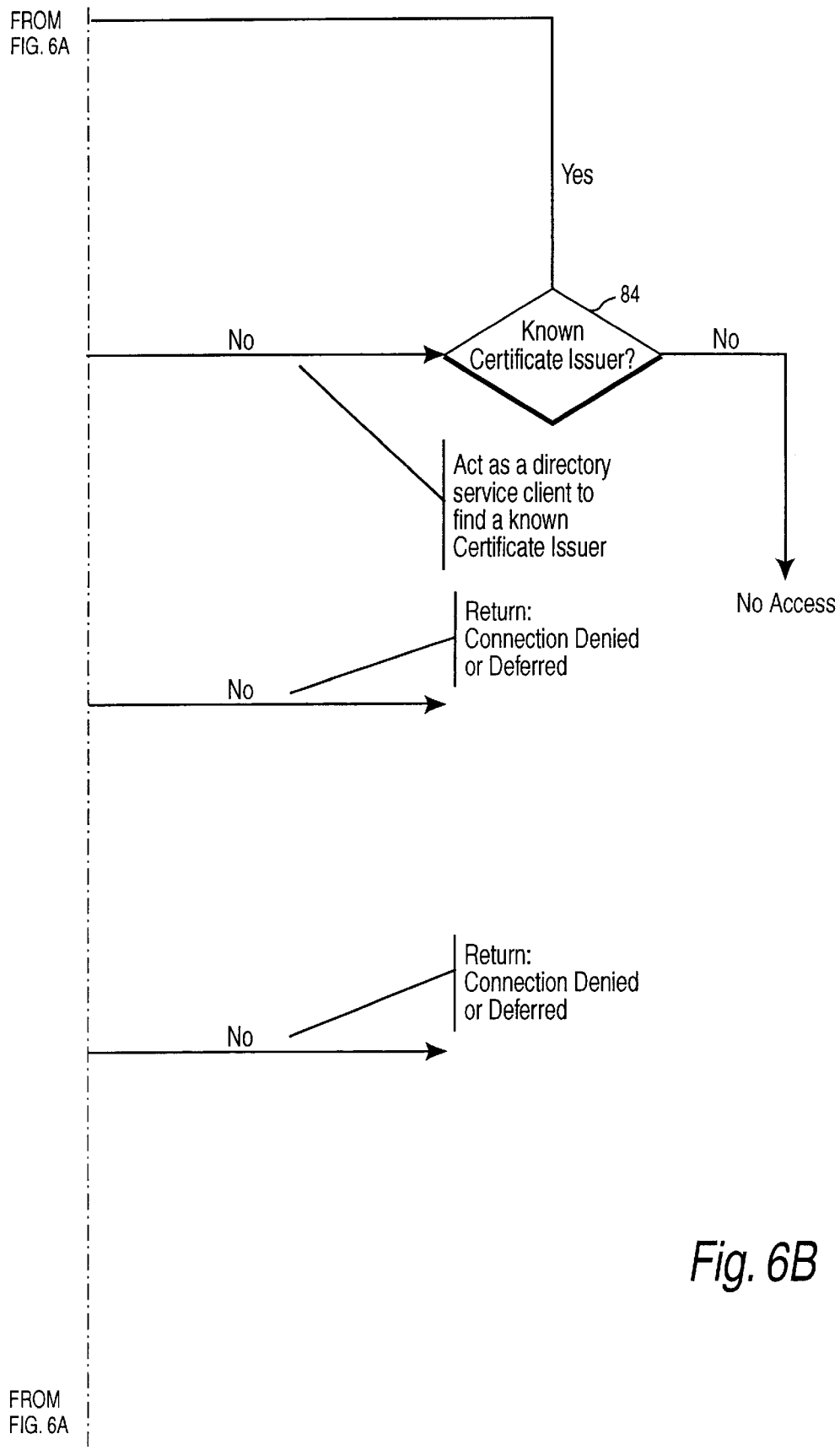

FIGS. 6A and 6B are a flowchart delineating the sequence of operations involved in an exemplary identification verification analysis. The input data to the directory server verification analysis component is the client identity which may include the digital certificate as, for example, shown in FIG. 4, communications context information which is a context descriptor that describes the nature and/or type of communication and a server identity which is the server's digital certificate. The directory server verification analysis flowchart shown in FIGS. 6A and 6B is implemented by software embodied within the directory server 42 shown in FIG. 2.

FIG. 7 is an exemplary verification descriptor object and FIG. 8 is an exemplary context descriptor data structure utilized in the verification analysis shown in FIG. 6. Turning first to the verification descriptor, the data structure/object shown in FIG. 7 includes a digital certificate identifying the client and a digital certificate identifying the server as well as a context descriptor. In the case of a null context descriptor, the context defaults to that of the directory server protocol. Thus, if there is no context descriptor, the context is presumed to be a communication session between a client communicating with a directory server. Alternatively, if a web client is communicating with a web server and the web server is performing a verification analysis, then the context descriptor is set to indicate a web server communicating with a web client. In the case of a null server identity, the server defaults to the directory server itself. If communication takes place between a web client and a web server, the web server inputs its web identity via its digital certificate.

As shown in FIG. 8, the illustrative context descriptor includes a version number field and a time field which indicates the coordinated universal time. The "protocol" field varies depending upon the particular communications context. For example, if a web server is communicating with a web client, the protocol may be the web protocol "http". If an E-mail client is communicating with an E-mail server, then the protocol may be the "SMTP" protocol. Additionally, any parameters defined by the protocol may be listed in the context descriptor.

Turning back to FIG. 6A, block 80, the directory server checks that the digital certificate issuer's public key is available to the directory server. For example, if Visa issued a digital certificate to a requesting party, a check is made at, for example, a web site to determine whether the web site can identify Visa and has access to Visa's public key. If the certificate issuer is known, then the digital signature of the certificate issuer may be verified.

Based upon the block 80 analysis, a determination is made as to whether the certificate issuer is known (82). If the certificate issuer is not known, then the directory acts as a directory client to attempt to find a known certificate issuer.

After the directory server acts as a directory client to find a known certificate issuer, a check is made at FIG. 6B, block 84, to determine whether a known certificate issuer has been found. If so, the routine branches back to block 80, and the routine continues. If no known certificate issuer is found, then access is denied.

An exemplary data structure or object utilized in conjunction with the block 80 analysis is shown in FIG. 9. As shown in FIG. 9, the certificate issuer's name is identified by using the verification descriptor's client identity and the issuer's identity information. As shown in FIG. 9, the verification process utilizes the issuer's public key and verification algorithm identifier information. If the data structure shown in FIG. 9 has a null or blank "issuer public key" field, resolving the unknown certificate issuer may involve either storing information from another directory in a local cache, acting as a directory service client to another directory service, or permitting an unknown signature by deferring resolution until the access control rules are searched. By permitting an unknown signature to be utilized, the system may accept the unknown signature, while relying on the access control rules to determine whether this is appropriate. For example, certain web sites may not care who the certificate issuer is and, in fact, wish to promote the web site to be accessed. Under these circumstances, the accessible control list rules may include specific restrictions identifying the context where an unknown certificate issuer is involved.

Turning back to FIG. 6A, if the certificate issuer's public key is available, the directory services verifies at block 86 the digital signature, such that the digital signature on the issuer's certificate matches the internally stored public key of the certificate issuer.

FIG. 10 shows an example of an object or data structure required to perform the verification operations of FIG. 6A, block 86. As shown in FIG. 10, the client identity is used which consists of the signed sequence embodied in a digital certificate previously discussed in conjunction with FIG. 4. The issuer's public key is also used which includes the information shown, including an algorithm identifier. Thus, the client identity, which is a signed sequence defined by a digital certificate, permits the signature to be verified with the issuer's public key.

A check is next made at FIG. 6A, block 88 to determine whether the signature is good. If the signature is bad, then as shown in FIG. 6B, access is denied or, as previously described, a decision may be made to defer resolving this issue until the access control rules are checked.

If the check in block 88 indicates that the signature is good, then, as indicated in block 90, the directory service verifies that the certificate is still currently valid by checking an internally stored certificate status or optionally, a check is made of an internally stored certificate revocation list.

FIG. 11 shows exemplary objects or data structures which may be used in performing the verification indicated at FIG. 6A, block 90. As shown in FIG. 11, the client identity information includes the digital certificate previously discussed. The certificate revocation list is a list of certificates which have been previously revoked and may be presented as attributes with an attribute-syntax certificate list. The list would be in the form of a signed sequence of certificates as shown in FIG. 11. The signed sequence includes the certificate serial numbers and the revocation date. The certificate revocation list would be prepared by the controlling directory service entity. If the certificate serial number identifying a client is stored in a certificate revocation list kept at a directory service and the certificate is revoked, the certificate revocation list may only be modified by those who are properly authorized. The revocation list may be prepared and revised by an authority connecting to the directory service having more expansive rights than the typical client. Such authority would include the authority to write into such data structures as the certificate revocation list. Such a connection would typically take place only with the directory service administrator's digital certificate. The directory service may not need to maintain a full certificate revocation list since it may be constructed from the raw data stored in the directory service. Thus, information may be stored in the directory service indicating that a particular certificate is not valid. Raw data stored in the directory service permits per certificate lookups for validity purposes. The certificate revocation list may be retrieved from a local cache, from another directory service or deferred until the ACL rule check.

Turning back to FIG. 6A, based on the processing in block 90, a check is made to determine if there is a valid certificate (92). If there is not a valid certificate, as determined by the check in block 92, then connection is denied or deferred as previously described.

If there is a valid certificate, then, in accordance with block 94 processing, the directory cross-references the client certificate, the server certificate and the communications context to retrieve an internally stored access control rule to apply to the client connection.

FIG. 12 discloses an exemplary object or data structure which may be used for the block 94, FIG. 6 processing, for retrieving an access control rule, an example of which is shown in FIG. 13. The set of access control rules are defined in the directory service database. Various directory servers may be linked so that access control rules stored in other directory servers may be utilized and may be required in order to fully determine the access control rules that apply. The directory servers may be linked based upon prearranged contractual trust relationships. For example, a trust relationship with a Visa card may require that Visa trust a given merchant and its cardholder, and that the merchant trust the Visa cardholder. The ACL rule is accessed by the server itself by use of the context and the client certificate and the server's certificate. An ACL rule is retrieved from the server's internal database, based on the client identity, the context descriptor (which may, for example, indicate whether E-mail or a web site related transaction is involved), and the server identity.

As shown in FIG. 13, the ACL rule is a digital sequence including a "to what" field, which, for example, may indicate that the rule applies to a web page. An ACL rule may also include parameters associated with the "to what" field which may, for example, include a web page address or a credit card number, the nature of the card and/or the cardholder's name. A "by what" field may also be included, which typically includes the client's certificate, which may be identified by a client ID. "By what" parameters are included which may be, for example, a digital certificate. An "access" field may also be included and is comprised of an integer defining the allowable directory access modes. By way of an example access integers 0–4 may respectively indicate search, compare, read, write or none. The access control rule may also include a version number.

If the certificate issuer's signature or the certificate revocation list checking operations were deferred until FIG. 6A, block 94 processing, then these events are passed on as part of the context field shown in FIG. 12. Additionally, the certificate revocation list can be part of an access control rule list in the deferred case. Additionally, it is noted that trust levels can be defined in an access control list rule. The access control rules may be retrieved from a local cache memory, or from another directory service. Limits may be placed on any particular limitation as to when access control rules must be kept local or when they may be retrieved from another directory service.

Turning back to FIG. 6A, the access control rule is applied to the data connection so that the client only receives the correct and intended data. The verification component thus returns an access rule to be applied for the client to the server.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for providing secure communications between a client at a first workstation and a computer, comprising the steps of:

receiving at said computer, a request from said client for at least one of information and services, said request including at least one digital certificate identifying said client;

checking at said computer to determine if the issuer of said digital certificate is recognized;

verifying that said digital certificate is valid;

retrieving, if the digital certificate is valid, an access control rule to apply to the communication session with said client during which at least one of information and services is provided to said client;

applying said access control rule to the communications session; and wherein said computer includes a directory and wherein said step of applying said access control rules includes the step of permitting the client to access said directory only in accordance with said access control rules.

2. A method for providing secure communications between a client at a first workstation and a computer, comprising the steps of:

receiving at said computer a request from said client for at least one of information and services, said request uniquely identifying said client;

checking at said computer to determine if the client is recognized by said computer;

retrieving, if said client is recognized, an access control rule to apply to the communication session with said client during which at least one of information and services is provided to said client; and applying said access control rule to the communications session with said clients, wherein said computer includes a directory and wherein said step of applying said access control rules includes the step of permitting the client to access said directory only in accordance with said access control rules.

3. A method for providing secure communications between a client at a first workstation and a computer, comprising the steps of:

receiving, at said computer, a request from said client of at least one of information and services, said request including at least one digital certificate identifying said client;

checking at said computer to determine if the digital signature in the digital certificate is valid;

retrieving an access control rule to apply to the communication session with said client during which at least one of information and services is provided to said client; and applying said access control rule to the communications session with the client, wherein said computer includes a directory and wherein said step of applying said access control rules includes the step of permitting the client to access said directory only in accordance with said access control rules.

4. A method for providing secure communications between a client at a first workstation coupled to a network including a plurality of computers, comprising the steps of:

receiving at a first computer a request from said client for at least one of information and services, said request uniquely identifying said client;

checking at said first computer to determine if the client is recognized;

checking at a second computer coupled to said network, to determine if the client is recognized;

retrieving from said second computer, if the client is recognized, an access control rule to apply to the communications session with said client during which at least one of information and services is provided to said client; and applying said access control rule to the communications session with said client, wherein said computer includes a directory and wherein said step of applying said access control rules includes the step of permitting the client to access said directory only in accordance with said access control rules.

5. A method for providing secure directory services communications between a client at a first workstation and a computer comprising the steps of:

transmitting from a client's workstation a request for directory services to said computer for at least one of information and services, said request including digital information for uniquely establishing that said client has a known identity which can subsequently be unambiguously verified;

checking to determine if the client is recognized by said computer;

retrieving an access control rule to apply to the communication session with said client during which directory services is provided to said client; and applying said access control rule to the communications session with said client.

6. A method according to claim 5, further including the step of accessing information related to the degree of trust which may be associated with said client.

7. A method for providing secure communications between a client at a first workstation coupled to a network including a plurality of computers, each of said plurality of computers including a directory server and an associated data base, comprising the steps of:

transmitting from said first workstation to a first computer of said plurality of computers a request from said user for at least one of information and services, said request uniquely identifying said client;

checking by the first computer's directory server, the associated data base at said first computer to determine if the client is recognized by said first computer;

checking by the second computer's directory server, the associated data base at said second computer coupled to said network, to determine if the client is recognized; and retrieving from said second computer, if the client is recognized, an access control rule to apply to the communication session with said client during which at least one of information and services is provided to said client.

8. A method according to claim 7, further including the step of accessing trust related information from the internal data base of said second computer.

9. A method according to claim 8, further including the step of applying the trust related information and the access control rule to the client's request to ensure that authorization levels are not exceeded.

10. A method according to claim 7, wherein said request is a request for an electronic business transaction transmitted to a web site.

11. A method according to claim 7, wherein the request is a request for a business transaction and wherein the server which recognizes the client develops transaction parameters in the context of the parties involved.

12. A method according to claim 7, wherein said transmitting step includes the step of uniquely identifying the client via a digital certificate.

13. A method according to claim 7, wherein said transmitting includes the step of transmitting data uniquely identifying the client including the client's public key.

14. A method according to claim 7, wherein said step of checking by said first computer's directory server includes the step of checking to determine if the public key of an identified certifying party is stored in said associated internal data base.

15. A method according to claim 7, further including the step of applying said access control rules to permit the client to access said directory only in accordance with said access control rules.

16. A method according to claim 7, wherein said client requests access to a web site via said request and further including the step of applying said access control rules to permit the client to perform operations at said web site only in accordance with said access control rules.

17. A method for providing secure directory services communications between a client at a first workstation and a computer having a directory server comprising the steps of:

transmitting from a client's workstation a request for directory services to said computer said request from said client including at least one of information and services, said request including a digital certificate for uniquely establishing that said client has a known identity which can subsequently be unambiguously verified;

verifying by said directory server the authorization for the server to comply with the request based upon at least one digital certificate and information related to the request context; and retrieving an access control rule to apply to the communication session with said client during which directory services is provided to said client.

18. A method according to claim 17, further including the step of applying said access control rule to the communications session with said client.

19. A method according to claim 17, wherein said request includes the client's public key.

20. A method according to claim 17, wherein said computer includes an internal data base and wherein said step of verifying includes the step of checking to determine if the public key of an identified certifying party is stored in said internal data base.

21. A method according to claim 18, wherein said computer includes a directory and wherein said step of applying said access control rules includes the step of permitting the client to access said directory only in accordance with said access control rules.

22. A method according to claim 18, wherein said client requests access to a web site via said request and wherein said step of applying said access control rules includes the step of permitting the client to perform operations at said web site only in accordance with said access control rules.

23. A method according to claim 17, further including the step of accessing information related to the degree of trust which may be associated with said client.

24. Apparatus for providing secure directory services while responding to a request for information or services by a client at a first workstation comprising:

a secure communications input module for receiving from said client's workstation a request for directory services including at least one of information and services, said request including a digital certificate for uniquely establishing that said client has a known identity which can subsequently be unambiguously verified;

a directory server module for responding to said request; and a database for storing information indicative of the public key of the issuer of the client's digital certificate and for storing access control rules to apply to requests;

said directory server module being operable to verify the authorization for the server to comply with the request based upon at least one digital certificate and information related to the request context and for retrieving an access control rule to apply to the communication session with said client during which directory services are provided to said client.

25. Apparatus according to claim 24, wherein said directory server module to operable to apply said access control rule is applied to the communications session with said client.

\* \* \* \* \*